(12) United States Patent
Lee

(10) Patent No.: US 7,522,230 B2
(45) Date of Patent: Apr. 21, 2009

(54) DISPLAY DEVICE

(75) Inventor: Kyoung-Don Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 302 days.

(21) Appl. No.: 11/496,247

(22) Filed: Jul. 31, 2006

(65) Prior Publication Data

US 2007/0079537 A1 Apr. 12, 2007

(30) Foreign Application Priority Data

Sep. 26, 2005 (KR) .................... 10-2005-0089176

(51) Int. Cl.
*G02F 1/1333* (2006.01)
*A47G 1/16* (2006.01)

(52) U.S. Cl. .............................. 349/58; 349/56; 40/750

(58) Field of Classification Search .................. 349/58, 349/16, 60, 56, 158, 193; 40/750
See application file for complete search history.

(56) References Cited

U.S. PATENT DOCUMENTS

| 5,835,139 | A | * | 11/1998 | Yun et al. ..................... 349/58 |
| 5,926,237 | A | * | 7/1999 | Yun et al. ..................... 349/58 |
| 6,373,537 | B2 | * | 4/2002 | Yun et al. ..................... 349/58 |
| 6,459,460 | B1 | | 10/2002 | Yamanaka ................... 349/58 |
| 7,092,048 | B2 | * | 8/2006 | Jeong ........................... 349/58 |
| 2002/0008802 | A1 | * | 1/2002 | Yun et al. ..................... 349/58 |
| 2003/0030763 | A1 | | 2/2003 | Nishioka ...................... 349/61 |
| 2007/0079537 | A1 | * | 4/2007 | Lee ............................. 40/750 |

FOREIGN PATENT DOCUMENTS

| JP | 2000-223858 | 8/2000 | ............... 349/58 X |
| JP | 2001-296816 | 10/2001 | ............... 349/58 X |
| JP | 2001-345898 | 12/2001 | ............... 349/58 X |
| JP | 2003-241170 | 8/2003 | ............... 349/58 X |
| JP | 2004-159173 | 6/2004 | ............... 349/58 X |
| JP | 2004-336403 | 11/2004 | ............... 349/58 X |
| KR | 10-0393629 | 7/2003 | ............... 349/58 X |
| KR | 10-0455765 | 10/2004 | ............... 349/58 X |
| KR | 10-2004-0097576 | 11/2004 | ............... 349/58 X |
| KR | 10-2004-0107050 | 12/2004 | ............... 349/38 X |
| KR | 10-2005-0052089 | 6/2005 | ............... 349/58 X |

* cited by examiner

*Primary Examiner*—Brian M Healy
(74) *Attorney, Agent, or Firm*—Cantor Colburn LLP

(57) ABSTRACT

A display device including a display panel displaying images, a protective member disposed on a front surface of the display panel and protecting the display panel and a support frame supporting both the display panel and the protective member. The support frame includes a guide part protruded in a direction perpendicular to a plate surface of the protective member and fixing the protective member such that the protective member is prevented from moving in a direction parallel to the plate surface. The support frame is adhered to edges of the protective member.

22 Claims, 6 Drawing Sheets

DISPLAY DEVICE

This application claims priority to Korean patent application number 10-2005-0089176 filed on Sep. 26, 2005, and all the benefits accruing therefrom under 35 U.S.C. §119, the contents of which are incorporated by reference herein in its entirety.

BACKGROUND OF THE INVENTION (a) Field of the Invention

The present invention relates to a display device, and more particularly to a display device having an improved support structure, that is, simple and includes a small thickness.

(b) Description of the Related Art

The rapid development of semiconductor technology has led to the rapid increase in demand for lightweight and compact display devices having improved performance, such as liquid crystal displays (LCDs).

The LCD has advantageous characteristics such as a small size, light weight, and low power consumption. Accordingly, the LCD has replaced the conventional cathode ray tube (CRT). Recently, the LCD has been widely used in information processing apparatuses and middle-sized and large-sized display apparatuses, for example, television sets and monitors, as well as small-sized display apparatuses such as mobile phones and personal digital assistants (PDAs).

A mobile phone, for example, is manufactured in a folder type for convenience of a user, and a dual display device in which two display panels are attached to the front and rear surfaces of a folder of the mobile phone is widely used.

However, when the two display panels are used, the overall thickness of the mobile phone increases and thus portability deteriorates. Accordingly, the display device must decrease in both size and weight.

In general, the mobile phone includes a casing forming an appearance of the mobile phone and a display device disposed in the casing. In a conventional mobile phone, a protective window for protecting a display panel of the display device is attached to the casing. Accordingly, the protective window and the display panel are separated from each other by at least 1 mm, which prevents the mobile phone from being reduced in thickness.

In order to reduce the gap between the protective window and the display panel, a support structure for supporting the protective panel and the display panel may be changed, which in turn complicates or weakens the device.

BRIEF SUMMARY OF THE INVENTION

An exemplary embodiment provides a display device having an improved support structure, including simplicity and a small thickness.

Exemplary embodiments provide a display device including a display panel displaying images, a protective member disposed on a front surface of the display panel and protecting the display panel and a support frame supporting both the display panel and the protective member. The support frame includes a guide part protruded in a direction perpendicular to a plate surface of the protective member and fixing the protective member such that the protective member is prevented from moving in a direction parallel to the plate surface. The support frame is adhered to edges of the protective member.

Exemplary embodiments include an adhesive member interposed between the edges of the protective member and the support frame. The adhesive member adheres the edges of the protective member and the support frame to each other.

In exemplary embodiments, the support frame may include a first support part supporting a surface of the display panel and a second support part supporting a surface of the protective member.

In exemplary embodiments, the first support part and the second support part form a step difference such that the protective member is spaced apart from the display panel.

In exemplary embodiments, an interval between the protective member and the display panel may be in a range of about 0.2 millimeter (mm) to about 0.6 millimeter (mm).

Exemplary embodiments provide a display device including a display panel displaying images, a protective member disposed on a front surface of the display panel and protecting the display panel and a support frame supporting the display panel and the protective member together. The support frame includes a first support part supporting a surface of the display panel and a second support part supporting a surface of the protective member.

In exemplary embodiments, the support frame may further include a guide part protruded in a direction perpendicular to a plate surface of the protective member and fixing the protective member such that the protective member is prevented from moving in a direction parallel to the plate surface.

In exemplary embodiments, the guide part may be disposed adjacent to a corner of the protective member.

In exemplary embodiments, the guide part may be disposed adjacent to a side surface of the protective member.

In exemplary embodiments, there may be further included an adhesive member interposed between edges of the protective member and the support frame and adhering the edges of the protective member and the support frame to each other.

In exemplary embodiments, the adhesive member may have a thickness of about 0.1 mm to about 0.5 mm.

In exemplary embodiments, the first support part and the second support part form a step difference.

In exemplary embodiments, the second support part may be positioned higher than the display panel by about 0.1 mm to about 0.5 mm.

In exemplary embodiments, an interval between the protective member and the display panel may be in a range of about 0.2 mm to about 0.6 mm.

In exemplary embodiments, the protective member includes a transparent material.

In exemplary embodiments, the display panel may be a liquid crystal display panel.

Exemplary embodiments provide an information processing apparatus including a housing and a display device disposed in the housing. The display device includes a display panel displaying images, a protective member disposed on a front surface of the display panel and protecting the display panel and a support frame supporting both the display panel and the protective member. The support frame includes a first support part supporting a lower surface of the display panel and a second support part supporting a lower surface of the protective member. The first support part and the second support part form a step difference.

According to the aspects of the present invention, it is possible to obtain an improved support structure, that is, simplicity and a small thickness.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
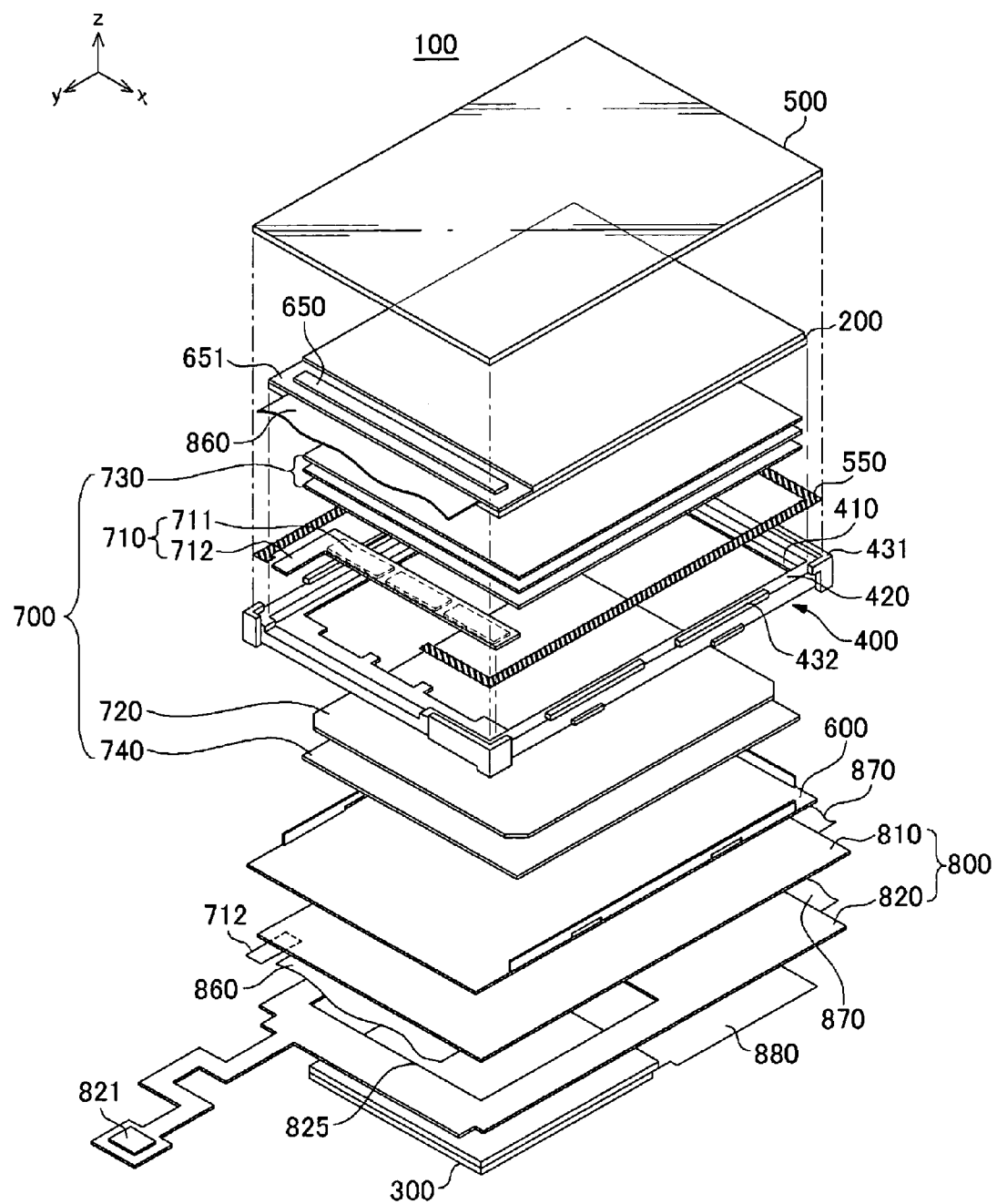
FIG. 1 is an exploded perspective view of an exemplary embodiment of a display device according to the present invention.

Now, a display device according to an embodiment of the present invention will be described with reference to the attached drawings. In the attached drawings, a small-sized display device using two display panels, that is, a display device used for a dual folder type mobile phone, is schematically shown as the exemplary embodiment of the present invention. The embodiments of the present invention are only exemplary, and the present invention is not limited thereto.

For clarity, portions that are not related to the present invention will be omitted. In addition, like elements are denoted by like reference numerals in the whole specification. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings. As shown in FIG. 1, a display device 100 includes a main display panel 200 for displaying images, a protective member 500 disposed on the front surface of the main display panel 200, a backlight assembly 700 for supplying light to the rear surface of the main display panel 200, a support frame 400 for supporting the protective member 500 and the main display panel 200 on the backlight assembly 700, and an adhesive member 550 for adhering the protective member 500 and the support frame 400 to each other. The display device 100 further includes a support member 600 coupled to the support frame 400 to receive the backlight assembly 700, a printed circuit board (PCB) 800 disposed on the rear surface of the support member 600 and a sub-display panel 300 that is supported by the printed circuit board 800 to face the main display panel 200. Here, the printed circuit board 800 includes a first printed circuit board 810 and a second printed circuit board 820.

The display device 100 further includes a first flexible printed circuit film (FPC) 860 for connecting the main display panel 200 and the first printed circuit board 810, a second FPC 870 for connecting the first printed circuit board 810 and the second printed circuit board 820, a third FPC 880 for connecting the sub-display panel 300 and the second printed circuit board 820, and a driving integrated circuit chip 650 that is mounted on one side of the main display panel 200 connected to the first FPC 860 to control the main display panel 200.

The driving integrated circuit chip 650 is surrounded by a protective film 651. Although the first and second FPCs 860 and 870 are shown disconnected or separate in FIG. 1 for convenience sake, the first and second FPCs 860 and 870 are actually connected. A driving integrated circuit chip (not shown) for controlling the sub-display panel 300 may be mounted on the third FPC 880.

Although the main display panel 200 and the sub-display panel 300 are shown in FIG. 1, these are only exemplary and the present invention is not limited thereto. In FIG. 1, a transmissive or transflective type of liquid crystal display (LCD) is shown as the main display panel 200 and a reflective type LCD is shown as the sub-display panel 300. However, these are only exemplary and the present invention is not limited thereto. In an alternative exemplary embodiment, a light receiving display panel and/or an organic light emitting display panel may be used in a display device.

The size (considered as an area or dimensions) of the main display panel 200 is larger relative to that of the sub-display panel 300 facing the main display panel 200. In exemplary embodiments, the display device 100 may be used for a folder type mobile phone, in which the main display panel 200 is located on the inner surface of a folder of the mobile phone and the sub-display panel 300 is located on the outer surface of the folder of the mobile phone. When the folder is closed, a relatively small amount of information, such as the time, can be obtained through the sub-display panel 300 having the relatively smaller size, and when the folder is opened, a relatively large amount of information can be obtained through the main display panel 200, having the relatively larger size.

The first and second printed circuit boards 810 and 820 transmit signals to the main display panel 200 and the sub-display panel 300 through the first, second and third FPCs 860, 870 and 880, respectively. A device connector 821 is mounted on one end of the second printed circuit board 820. The device connector 821, may be considered as a mobile phone connector where the device is a mobile phone. In exemplary embodiments, the first and second printed circuit boards 810 and 820 receive the signals, which depend on opening and closing of the folder of the mobile phone, through the mobile phone connector 821.

The backlight assembly 700 for supplying the light to the main display panel 200 is interposed between the main display panel 200 and the sub-display panel 300. In the exemplary embodiment of FIG. 1, since the reflective type of LCD is shown as the sub-display panel 300, the sub-display panel 300 need not receive the light from the backlight assembly 700.

The backlight assembly 700 includes a light source unit 710 for emitting the light, a light guide plate 720 for guiding the light emitted from the light source unit 710 to the main display panel 200, a reflection sheet 740 disposed on the rear surface of the light guide plate 720, and an optical sheet 730 interposed between the light guide plate 720 and the main display panel 200 to improve brightness and uniformly diffuse the light, all of which are received and fixed by the support frame 400 and the support member 600.

Although a light emitting diode (LED) 711 mounted on a light source circuit board 712 is shown as the light source unit 710 in FIG. 1, the LED is only exemplary and the present invention is not limited thereto. In alternative exemplary embodiments, a linear light source or a surface light source using the LED 711 may be used. Three LEDs 711 are illustrated in FIG. 1, however, the number of the LEDs is only exemplary and the present invention is not limited thereto. In alternative exemplary embodiments, the number of LEDs 711 may vary as needed. The light source circuit board 712 is connected to the first printed circuit board 810 to receive a light source control signal from the first printed circuit board 810 and to drive the LED 711.

The protective member 500 is disposed on the front surface of the main display panel 200 and protects the main display panel 200. The protective member 500 may include, but is not limited to, a transparent material such as glass or acrylic resin, such that images displayed by the main display panel 200 can be externally viewed.

The support frame 400 supports the edges of the main display panel 200 and the protective member 500. The support frame 400 supports the protective member 500 and the main display panel 200 in a state such that the protective member 500 is spaced apart from the main display panel 200. In exemplary embodiments, an interval between the protective member 500 and the main display panel 200 is in a range of about 0.2 millimeter (mm) to about 0.6 millimeter (mm). When the interval between the protective member 500 and the main display panel 200 is less than 0.2 mm, the protective member 500 may come in contact with the main display panel 200 by external pressure applied to the protective member 500. When the protective member 500 and the main display panel 200 come in contact with each other, damage such as a scratch may occur in the main display panel 200. In contrast, when the interval between the protective member 500 and the main display panel 200 is greater than 0.6 mm, the overall thickness of the display device 100 increases.

The support frame 400 includes a first support part 410 for supporting the main display panel 200 and a second support part 420 for supporting the protective member 500. The support frame 400 further includes guide parts 431 and 432 that are protruded from the second support part 420 in a direction substantially perpendicular to the plate surface of the protective member 500. The guide parts 431 and 432 fix the protective member 500 to prevent the protective member 500 from moving in a direction parallel to the plate surface.

Figure 2:
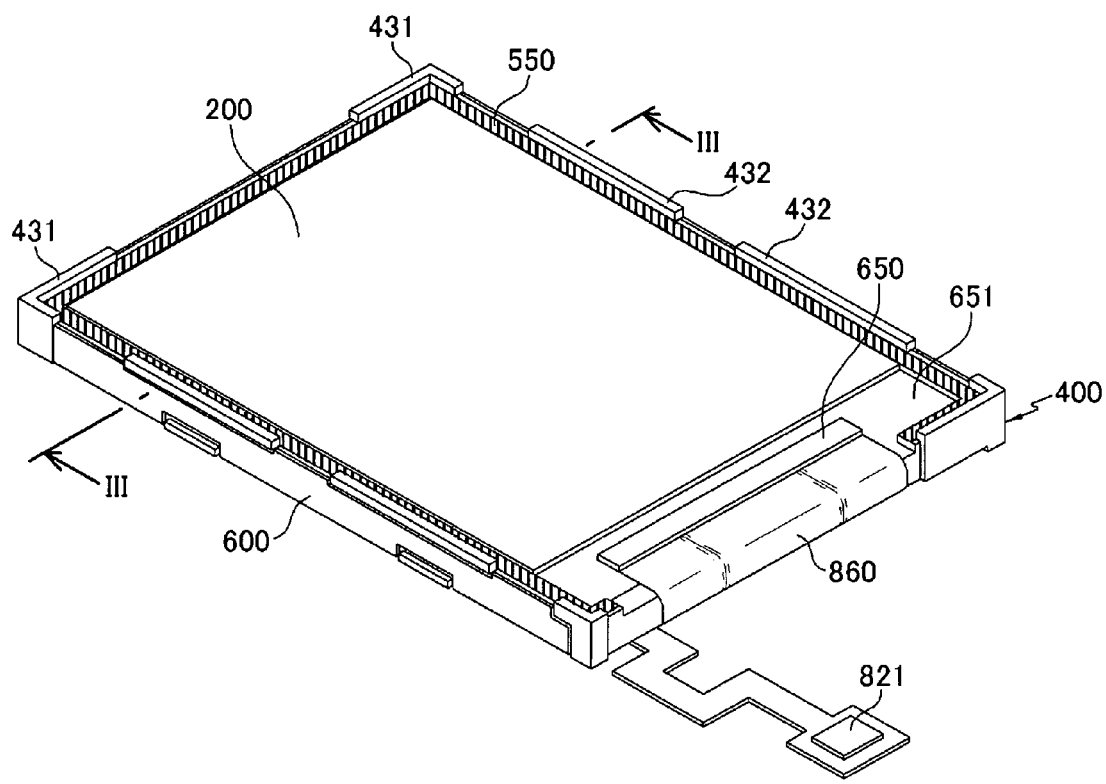
FIG. 2 is a perspective view of the display device of FIG. 1.

FIG. 2 shows the display device 100 in which all the elements except the protective member 500 are assembled for convenience of description.

As shown in FIG. 2, the guide parts 431 and 432 are formed adjacent to the side surfaces of the protective member 500 and at corners of the protective member 500. However, this structure is only exemplary and the present invention is not limited to thereto. In alternative exemplary embodiments, the guide parts 431 and/or 432 may be formed only at any one of the corners and any of a number of side surfaces of the protective member 500.

Figure 3A:
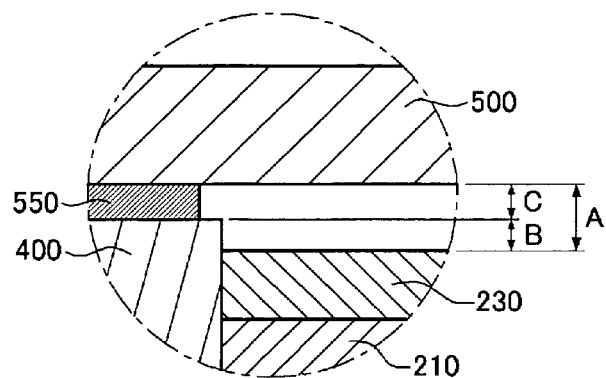
FIGS. 3A and 3B are cross-sectional views taken along line III-III of FIG. 2.
Figure 3B:
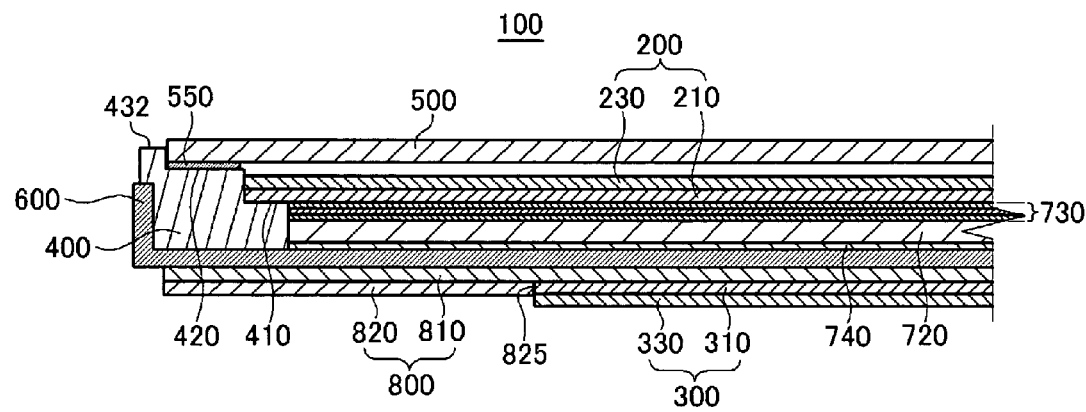

FIGS. 3A and 3B are cross-sectional views taken along line III-III of FIG. 2.

As shown in FIGS. 3A and 3B, the first support part 410 and the second support part 420 are arranged to form a step including a difference in height between surfaces of the first and second support parts 410 and 420 supporting the main display panel 200 and protective member 500, respectively. The main display panel 200 and the protective member 500 can be stably supported. A supporting surface of the second support part 420 is positioned higher than a supporting surface of the first support part 410 relative to a bottom surface of the support frame 400. In an exemplary embodiment, the supporting surface of the second support part 420 is positioned higher than an upper surface of the main display panel 200 supported by the first support part 410 by about 0.1 mm to about 0.5 mm.

The adhesive member 550 is interposed between the edges of the protective member 500 and the second support part 420 of the support frame 400 to adhere the edges of the protective member 500 and the support frame 400 to each other. In exemplary embodiments, a double sided tape may be used as the adhesive member 550, but the present invention is not limited thereto. Any of a number of various methods for adhering the protective member 500 and the support frame 400 to each other may be used as it suitable for the purpose described herein.

In exemplary embodiments, the thickness C of the adhesive member 550 may be in a range of about 0.1 mm to about 0.5 mm. When the thickness of the adhesive member 550 is less than 0.1 mm, the protective member 500 and the main display panel 200 may come in contact with each other and thus the main display panel 200 may be damaged. When the thickness of the adhesive member 550 is greater than 0.5 mm, the overall thickness of the display device 100 increases. In an exemplary embodiment, the adhesive member 550 has a substantially constant thickness C and a step B exists between the supporting surface of the second support part 420 of the support frame 400 and the upper surface of the main display panel 200 supported by the first support part 410. An interval A is considered to be a distance between a lower surface of the protective member 500 and the upper surface of the main display panel 200 and may be in a range of about 0.2 mm to about 0.6 mm.

The first printed circuit board 810 and the second printed circuit board 820 are sequentially disposed on the rear surface of the support member 600. An opening 825 is formed in the second printed circuit board 820, and the sub-display panel 300 is disposed in the opening 825. The third FPC 880 (shown in FIG. 1) for connecting the sub-display panel 300 and the second printed circuit board 820 is attached to the rear surface of the second printed circuit board 820.

Figure 4:
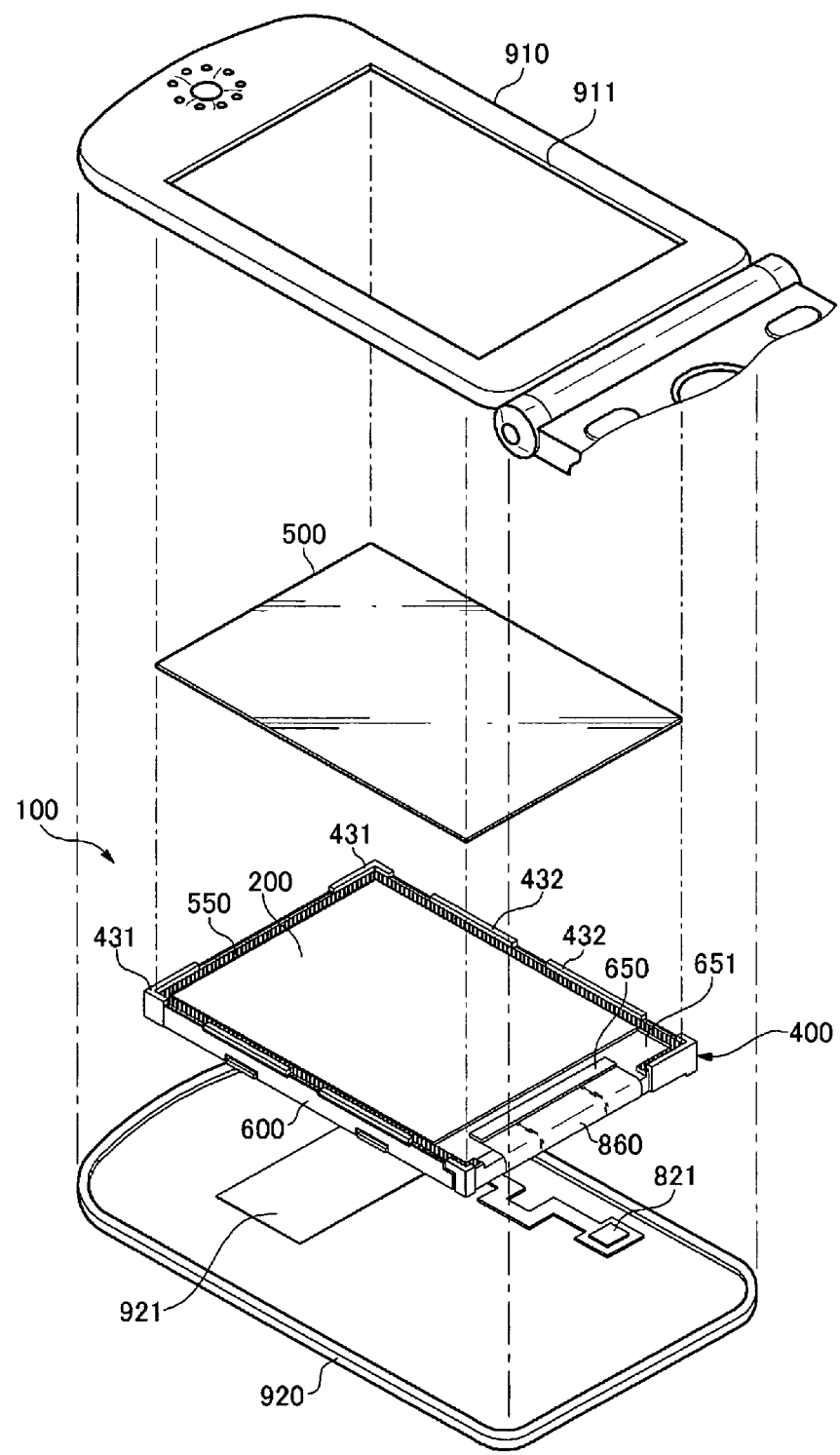
FIG. 4 is an exploded perspective view of an exemplary embodiment of a mobile phone using the display device of FIG. 1.

FIG. 4 shows the display device 100 used in an exemplary embodiment of a mobile phone. The mobile phone includes a front casing 910 and a rear casing 920 coupled to the front casing 910. The display device 100 is disposed in a space formed by the front casing 910 and the rear casing 920. A front screen 911 for displaying images formed by the main display panel 200 of the display device 100 is formed on the front casing 910 and a rear screen 921 for displaying images formed by the sub-display panel 300 is formed on the rear casing 920. The front screen 911 is in contact with the protective member 500 of the display device 100. The protective member 500 that faces the front screen 911 of the front casing 910 is fixed to the display device 100 instead of the front casing 910. The protective member 500 is spaced apart from the main display panel 200 by a minimum interval.

Advantageously, the overall thicknesses of the display device 100 and the mobile phone including the same can be minimized. Additionally, since the support frame 400 supports the main display panel 200 and the protective member 500, the entire support structure can also be simplified.

Referring again to FIGS. 3A and 3B, each of the main display panel 200 and the sub-display panel 300 includes first display plates 210 and 310, second display plates 230 and 330, and polarizers (not shown) attached to the outer surfaces of the first display plates 210 and 310 and the second display plates 230 and 330.

Hereinafter, an exemplary embodiment of an internal structure of the main display panel 200, such as an LCD panel, and elements for driving the same will be described in detail with reference to FIGS. 5 and 6. The structure of the main display panel 200 is essentially the same as that of the sub-display panel 300, and their detailed description will be omitted.

Figure 5:
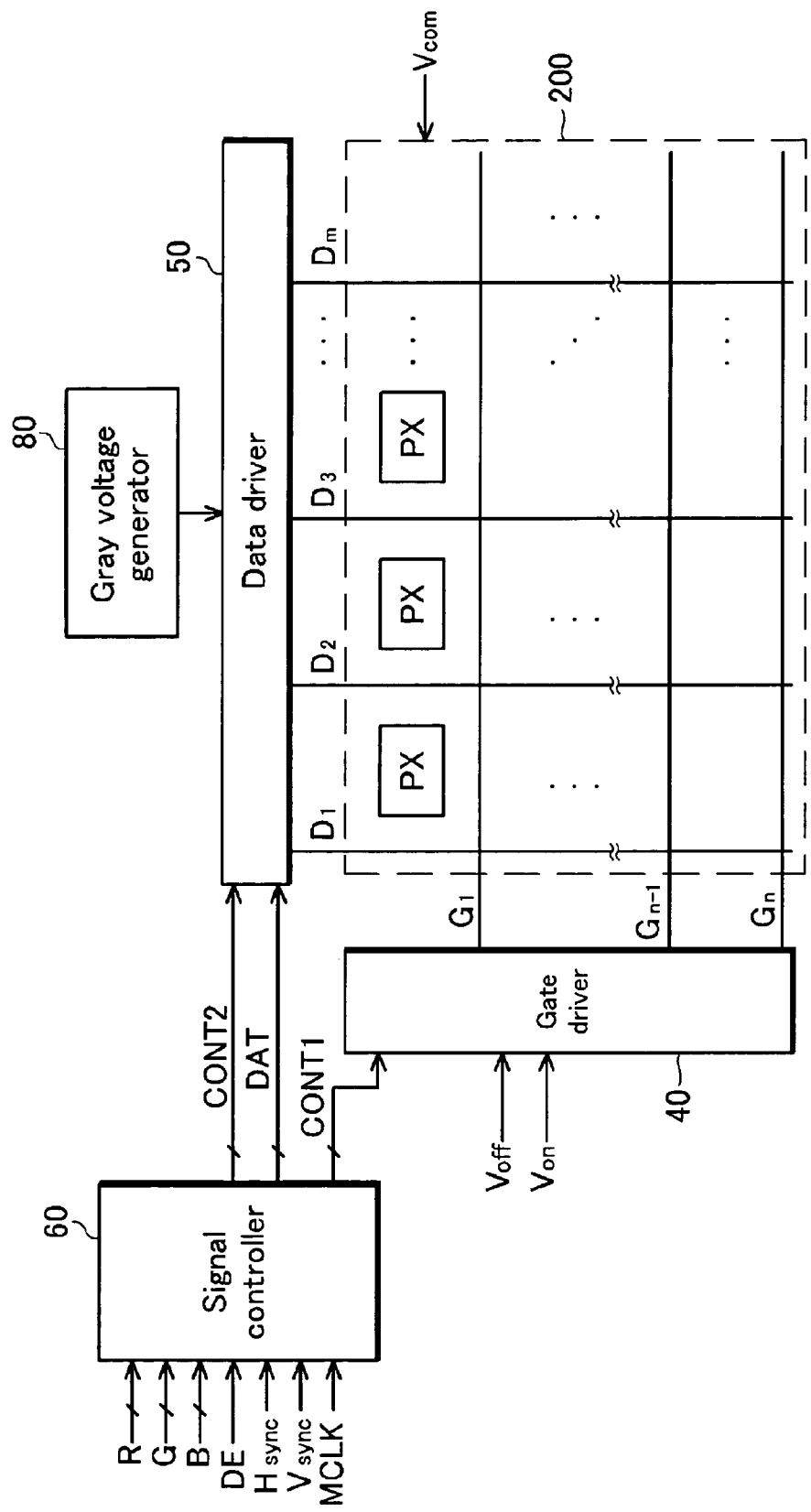
FIG. 5 is a block diagram of an exemplary embodiment of a display panel of the display device and elements for driving the display panel according to the present invention.
Figure 6:
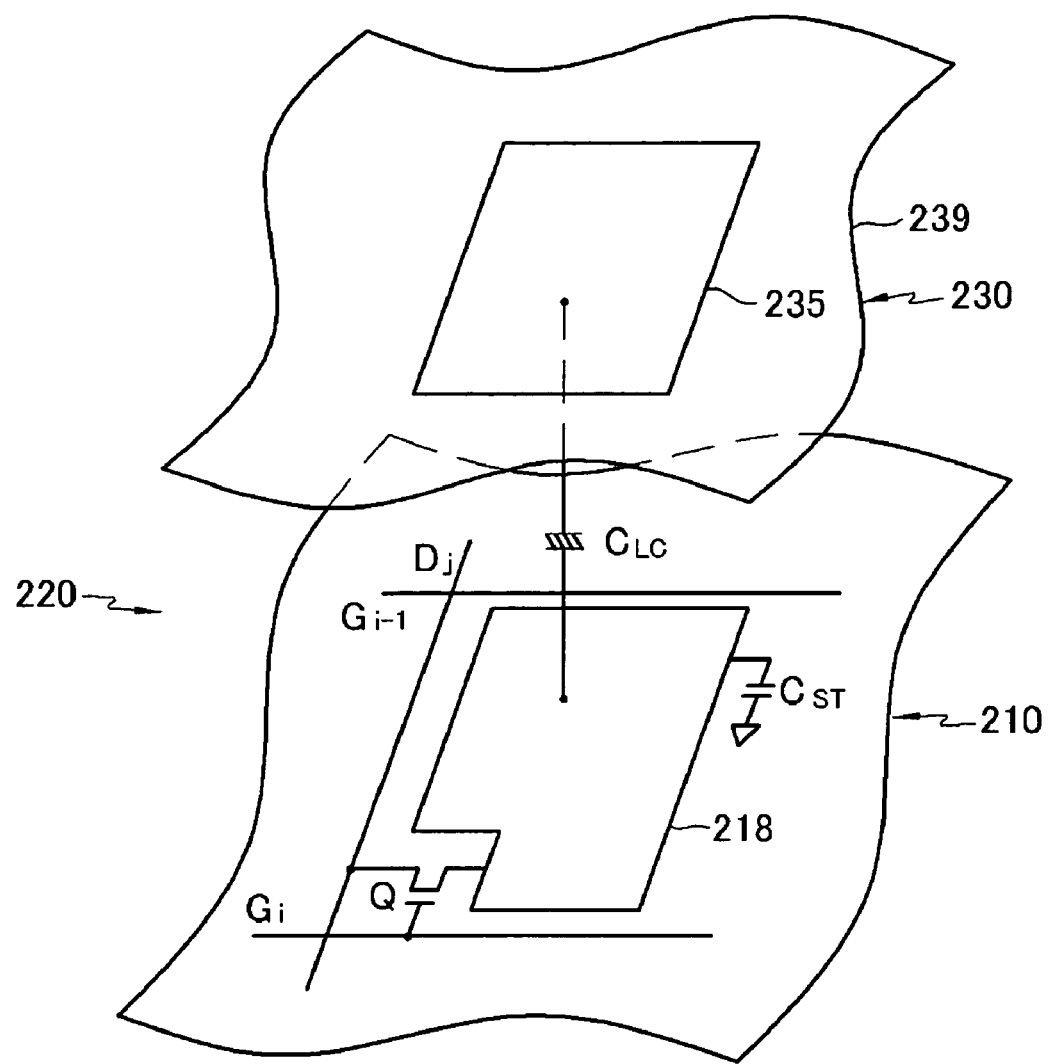
FIG. 6 is an equivalent circuit diagram of an exemplary embodiment of a pixel of the display panel of FIG. 5.

As shown in FIGS. 5 and 6, the first display plate 210 includes a plurality of signal lines $G_1$ to $G_n$ and $D_1$ to $D_m$. The first display plate 210 and the second display plate 230 include a plurality of pixels PX that are connected to a plurality of the signal lines $G_1$ to $G_n$ and $D_1$ to $D_m$ and arrayed substantially in a matrix.

The signal lines $G_1$ to $G_n$ and $D_1$ to $D_m$ include a plurality of gate lines $G_1$ to $G_n$ for transmitting gate signals (sometimes, referred to as a "scan signal") and a plurality of data lines $D_1$ to $D_m$ for transmitting data signals. The gate lines $G_1$ to $G_n$ extend substantially in parallel to each other and substantially in a row direction. The data lines $D_1$ to $D_m$ extend in substantially in parallel to each other and substantially in a column direction.

Each of the pixels PX includes a switching device Q connected to any one of the signal lines $G_1$ to $G_n$ and $D_1$ to $D_m$, a liquid crystal capacitor $C_{LC}$ connected thereto, and a storage capacitor $C_{ST}$. In exemplary embodiments, the storage capacitor $C_{ST}$ may be omitted as needed.

In exemplary embodiments, the switching device Q may be a three-port device, such as a thin film transistor disposed in the first display plate 210. The thin film transistor has a control port connected to one of the gate lines $G_1$ to $G_n$ an input port connected to one of the data line $D_1$ to $D_m$, and an output port connected to the liquid crystal capacitor $C_{LC}$ and the storage capacitor $C_{ST}$.

The driving integrated circuit chip 650 (shown in FIG. 1) includes a signal controller 60, a gate driver 40 and a data driver 50 connected to the signal controller 60, and a gray voltage generator 80 connected to the data driver 50.

The signal controller 60 controls the operations of the gate driver 40 and the data driver 50. The gate driver 40 applies gate signals constructed by a combination of a gate-on voltage $V_{on}$ and a gate-off voltage $V_{off}$ to the gate lines $G_1$ to $G_n$, and the data driver 50 applies data voltages to the data lines $D_1$ to $D_m$. The gray voltage generator 80 generates two grayscale voltage sets corresponding to transmittance of the pixel and supplies the two grayscale voltage sets to the data driver 50 as the data voltages. One grayscale set has a positive value with respect to a common voltage $V_{com}$ and the other grayscale set has a negative value with respect to the common voltage $V_{com}$.

As shown in FIG. 6, two ports of the liquid crystal capacitor $C_{LC}$ are a pixel electrode 218 of the first display plate 210 and a common electrode 239 of the second display plate 230. A liquid crystal layer 220 is interposed between the two electrodes 218 and 239 serves as a dielectric member. The pixel electrode 218 is connected to the switching device Q, and the common electrode 239 is disposed on substantially the entire surface of the second display plate 230 to receive the common voltage $V_{com}$. In alternative exemplary embodiments, the common electrode 239 may be disposed on the first display plate 210 and/or at least one of the two electrodes 218 and 239 may be formed substantially in a shape of a line or bar. A color filter 235 for applying color to the transmitted light is formed on the second display plate 230. In alternative exemplary embodiments, the color filter 235 may be formed on the first display plate 210.

The storage capacitor $C_{ST}$ may have an auxiliary function for the liquid crystal capacitor $C_{LC}$ may be constructed by overlapping a separate signal line (not shown) and the pixel electrode 218 provided to the first display plate 210 with an insulating member interposed therebetween, and a predetermined voltage such as the common voltage $V_{com}$ is applied to the separate signal line. In alternative exemplary embodiments, the storage capacitor $C_{ST}$ may be constructed by overlapping the pixel electrode 218 and the gate line $G_1$ to $G_n$ disposed just above with an insulating member interposed therebetween.

When the thin film transistor (which is a switching element) is turned on, an electric field is generated between the pixel electrode 218 and the common electrode 239. Due to the electric field, alignment angles of a liquid crystal layer 220 interposed between the first display plate 210 and the second display plate 230 change, so that transmittance of light changes. As a result, desired images can be obtained. The structure and the driving method of the main display panel 200 also apply to the sub-display panel 300.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

In exemplary embodiments according to the present invention, it is possible to provide a display device having an improved support structure including simplicity and a small thickness.

A protective member for protecting a display panel is integrally formed with the display device and is spaced apart from a main display panel by a minimum interval. Advantageously, it is possible to minimize the overall thicknesses of the display device and a mobile phone including the same.

Additionally, since a support frame supports the display panel and the protective member together, it is possible to simplify the whole support structure.

What is claimed is:

1. A display device comprising:
   a display panel displaying images;
   a protective member disposed on a front surface of the display panel and protecting the display panel; and
   a support frame supporting and contacting a lower surface of the display panel and supporting and contacting a lower surface of the protective member,
   wherein the support frame comprises a guide part protruded in a direction perpendicular to a plate surface of the protective member and fixing the protective member such that the protective member is prevented from moving in a direction parallel to the plate surface, and the support frame is adhered to edges of the protective member.

2. The display device of claim 1, further comprising an adhesive member interposed between the edges of the protective member and the support frame and adhering the edges of the protective member and the support frame to each other.

3. The display device of claim 2, wherein the support frame further comprises
   a first support part supporting a surface of the display panel; and
   a second support part supporting a surface of the protective member.

4. The display device of claim 3, wherein the first support part and the second support part form a step difference such that the protective member is spaced apart from the display panel.

5. The display device of claim 4, wherein an interval between the protective member and the display panel is in a range of about 0.2 millimeter (mm) to about 0.6 millimeter (mm).

6. A display device comprising:
   a display panel displaying images;
   a protective member disposed on a front surface of the display panel and protecting the display panel; and
   a support frame supporting the display panel and the protective member together,
   wherein the support frame comprises a first support part contacting a lower surface of the display panel and a second support part supporting a lower surface of the protective member.

7. The display device of claim 6, wherein the support frame further comprises a guide part protruded in a direction perpendicular to a plate surface of the protective member and fixing the protective member such that the protective member is prevented from moving in a direction parallel to the plate surface.

8. The display device of claim 7, wherein the guide part is disposed adjacent to a corner of the protective member.

9. The display device of claim 7, wherein the guide part is disposed adjacent to a side surface of the protective member.

10. The display device of claim 6, further comprising an adhesive member interposed between edges of the protective member and the support frame and adhering the edges of the protective member and the support frame to each other.

11. The display device of claim 10, wherein the adhesive member has a thickness of about 0.1 mm to about 0.5 mm.

12. The display device of claim 6, wherein the first support part and the second support part form a step difference.

13. The display device of claim 12, wherein the second support part is positioned higher than the display panel by about 0.1 mm to about 0.5 mm.

14. The display device of claim 6, wherein an interval between the protective member and the display panel is in a range of about 0.2 mm to about 0.6 mm.

15. The display device of claim 6, wherein the protective member comprises a transparent material.

16. The display device of claim 6, wherein the display panel is a liquid crystal display panel.

17. An information processing apparatus comprising:
    a housing; and
    a display device disposed in the housing, the display device comprising:
       a display panel displaying images;
       a protective member disposed on a front surface of the display panel and protecting the display panel; and
       a support frame supporting both the display panel and the protective member;
    wherein the support frame comprises a first support part contacting a lower surface of the display panel and a second support part supporting a lower surface of the protective member, the first support part and the second support part forming a step difference.

18. The information processing apparatus of claim 17, wherein the protective member contacts a display surface of the housing.

19. The information processing apparatus of claim 17, wherein the protective member is fixed to the display device and is spaced from the display panel by about 0.2 mm to about 0.6 mm.

20. The information processing apparatus of claim 17, wherein the housing is a part of a mobile telephone.

21. The display device of claim 6, wherein the lower surface of the display panel is a surface of the display panel disposed furthest from an outside along a viewing direction and the lower surface of the protective member is a surface of the protective member disposed furthest from the outside along the viewing direction.

22. The information processing apparatus of claim 17, wherein the lower surface of the display panel is a surface of the display panel disposed furthest from an outside along a viewing direction and the lower surface of the protective member is a surface of the protective member disposed furthest from the outside along the viewing direction.

* * * * *